UNITED STATES PATENT OFFICE.

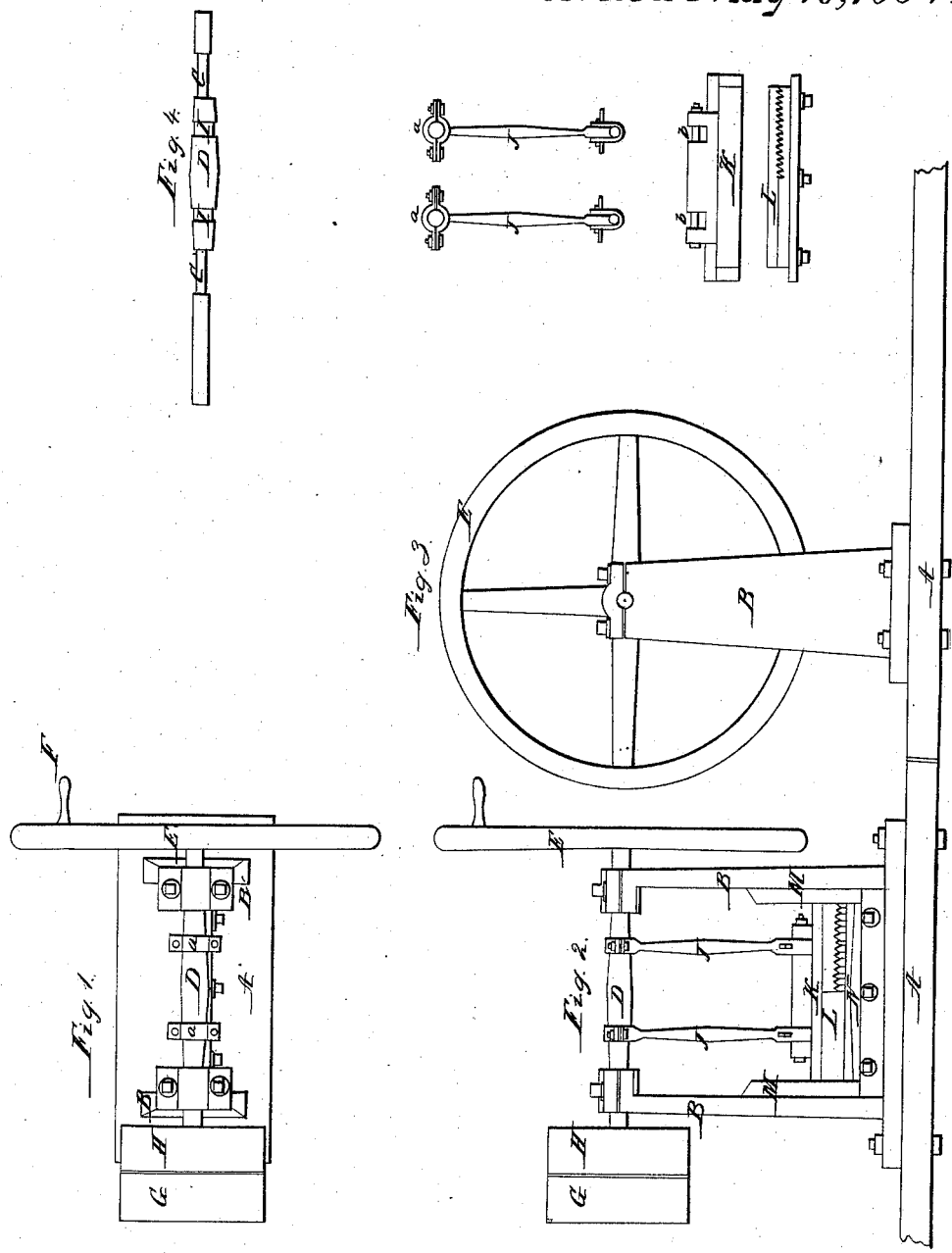

WARD EATON, OF CARBONDALE, PENNSYLVANIA.

MACHINE FOR CUTTING GLAZIERS' POINTS.

Specification forming part of Letters Patent No. 10,925, dated May 16, 1854; Reissued March 6, 1866, No. 2,185.

*To all whom it may concern:*

Be it known that I, WARD EATON, of Carbondale, in the county of Luzerne and State of Pennsylvania, have invented certain new and useful Improvements in Machines for Cutting Glaziers' Points; and I do hereby declare the following to be a full, clear, and exact description of the same, reference being had to the accompanying drawings, making a part thereof, in which—

Figure 1 represents a plan or top view. Fig. 2 represents a front elevation. Fig. 3 represents an end view, and Fig. 4 represents portions detached from the machine. Similar letters in the several figures denote like parts.

The nature of my invention relates to the so forming and operating of the cutting dies, as that the serrated one of the pair or set, shall cut off from the plate a number of perfect points, equal to one-half of the width of the plate, and at the same time form or cut the two sides of the remaining portion of the plate, the third sides of said remaining portion being cut from the plate by the straight blade or cutter of the pair, and this only when both cutters have inclined cutting edges so that the points are separated from the sheet one at a time, which prevents their being warped or bent by the action of the cutters.

To enable others skilled in the art to make and use my invention, I will proceed to describe the same with reference to the drawings.

A, represents the base of the machine, and B, the uprights, which are provided at top with suitable bearings for the journals c, c, of the cam shaft D, to rotate in.

E, is a fly wheel, with a crank F, by means of which motion may be communicated to the cutters.

G, H, are fast and loose pulleys of usual construction for driving the machine by means of an endless belt passing around them and driven by any first mover.

I, I, are two cams arranged on the shaft D, around which pass the straps or stirrups a, a, of the two connecting rods J, J, the other ends of said connecting rods being attached to the rod b, passing through the top of the stock K, to which the partially serrated and partly straight shear blades L, are attached. The stock K, is raised and lowered through the action of the cams I, I, and connecting rods J, J, through or by the rotation of the shaft D, and said stock is restrained by the guides M, M, in its rising and falling so as to bring the cutting edges close up against the stationary blade N. The cutting edges of the blade L, are inclined to that of the blade N, so as to give them a shear cut, but more especially so that the cutting shall commence at one edge, and cut but one point at a time. This saves much of the power required to run the machine, and it prevents the points from being bent by the action of the cutters.

The advantages of this machine are that there is no waste of the tin or other sheet metal from which the points are cut, the first cut making a series of finished points and leaving a serrated edge on the plate like saw teeth, the next cut taking off the serrated edge and leaving a straight edge, and so on alternately. Besides the points thus cut are perfectly flat, so that they are evenly and easily driven, and bear equally on the glass.

Having thus fully described the nature of my invention what I claim therein as new and desire to secure by Letters Patent, is—

The combination of a partially serrated or indented, and straight cutter, having a reciprocating vertical motion with a stationary blade, so that the serrated part of the blade shall cut out one half of the sheet in points, and at the same time form two of the three sides of the remaining points of the sheet, which are cut therefrom by the straight blade, and thus cut up the entire sheet without waste, and this I claim only, when said cutting edges are so inclined to each other as that but one point of the series cut from the sheet shall be cut off at a time which prevents their warping or bending, substantially as described.

WARD EATON.

Witnesses:
 DENNIS PUGHE,
 ALFRED DENT.

[FIRST PRINTED 1913.]